United States Patent
Jagana et al.

(10) Patent No.: US 7,843,871 B2
(45) Date of Patent: *Nov. 30, 2010

(54) METHOD OF REESTABLISHING COMMUNICATION BY A MOBILE NODE UPON RECOVERY FROM AN ABRUPT SHUT DOWN

(75) Inventors: Venkata R. Jagana, Portland, OR (US); Krishna Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 733 days.

This patent is subject to a terminal disclaimer.

(21) Appl. No.: 11/681,676

(22) Filed: Mar. 2, 2007

(65) Prior Publication Data

US 2007/0147304 A1    Jun. 28, 2007

Related U.S. Application Data

(63) Continuation-in-part of application No. 11/019,766, filed on Dec. 21, 2004, now Pat. No. 7,529,207.

(51) Int. Cl.
*H04W 4/00* (2009.01)
(52) U.S. Cl. .................................. 370/328
(58) Field of Classification Search .......... 370/216, 370/242, 331, 338, 342, 328; 455/432.1
See application file for complete search history.

(56) References Cited

U.S. PATENT DOCUMENTS

| | | | |
|---|---|---|---|
| 6,195,705 B1 | 2/2001 | Leung | |
| 6,578,085 B1 * | 6/2003 | Khalil et al. | 709/241 |
| 6,917,605 B2 * | 7/2005 | Kakemizu et al. | 370/338 |
| 6,987,771 B2 * | 1/2006 | Shimizu et al. | 370/401 |
| 7,286,520 B2 * | 10/2007 | Takeda et al. | 370/349 |
| 7,489,667 B2 * | 2/2009 | Faccin et al. | 370/338 |
| 2001/0021175 A1 | 9/2001 | Haverinen | |
| 2002/0067704 A1 * | 6/2002 | Ton | 370/329 |
| 2002/0128008 A1 * | 9/2002 | Phan-Anh et al. | 455/424 |
| 2002/0147837 A1 | 10/2002 | Heller | |
| 2003/0095522 A1 | 5/2003 | Korus et al. | |

(Continued)

FOREIGN PATENT DOCUMENTS

WO    WO 03034683    4/2003

OTHER PUBLICATIONS

K. Omea et al. "Mobile Node Extension Employing Buffering Function To Improve Handoff Performance", IEEE 2002, pp. 62-66.

(Continued)

*Primary Examiner*—Lester Kincaid
*Assistant Examiner*—Nathan Mitchell
(74) *Attorney, Agent, or Firm*—Lieberman & Brandsdorfer, LLC

(57) ABSTRACT

When a mobile node suffers an abrupt shut down while operating in a foreign network and recovers in a new foreign network, the invention enables the mobile node to reestablish communication capability, without time delay, with the nodes that had established one or more communication sessions with the mobile node prior to the abrupt shut down. The mobile node of the invention includes an update module that determines whether additional information needs to be sent to the nodes in communication with the mobile node prior to the mobile node suffering an abrupt shut down. Based on that determination, the update module may provide additional information to such nodes.

17 Claims, 9 Drawing Sheets

U.S. PATENT DOCUMENTS

| | | |
|---|---|---|
| 2003/0142673 A1 | 7/2003 | Patil et al. |
| 2003/0185196 A1 | 10/2003 | Venkitaraman |
| 2003/0211842 A1 | 11/2003 | Kempf et al. |
| 2004/0023653 A1 | 2/2004 | O'Neill |
| 2004/0024901 A1 | 2/2004 | Agrawal et al. |
| 2004/0029584 A1 | 2/2004 | Le et al. |
| 2004/0090941 A1* | 5/2004 | Faccin et al. ................ 370/338 |
| 2004/0111510 A1* | 6/2004 | Shoaib et al. ................ 709/224 |
| 2005/0144303 A1* | 6/2005 | Zhang et al. ................ 709/231 |
| 2005/0265380 A1* | 12/2005 | Takahashi et al. ........... 370/464 |
| 2007/0147392 A1* | 6/2007 | Oka ...................... 370/395.52 |

OTHER PUBLICATIONS

H. Kim et al. "A Time-Based Binding Update In Mobile IP Networks With Very High Mobility", IEEE2002, pp. 1025-1029.

P. Sung et al. "Enhancement Of Binding Update For Mobile IP", IEEE 2002.

* cited by examiner

METHOD OF REESTABLISHING COMMUNICATION BY A MOBILE NODE UPON RECOVERY FROM AN ABRUPT SHUT DOWN

RELATED APPLICATION

This application is a continuation-in-part of U.S. Patent Application entitled "Method of Reestablishing Communication by a Mobile Node upon Recovery from an Abrupt Shut Down," by Venkata R. Jagana and Krishna K. Kumar, having U.S. application Ser. No. 11/019,766 and filed on Dec. 21, 2004 now U.S. Pat. No. 7,529,207, which patent application is incorporated herein by reference in its entirety.

FIELD OF THE INVENTION

This invention relates to networking technology, and in particular, the invention relates to reestablishing connection by a mobile node with its corresponding nodes, after the mobile node had an abrupt and unexpected shut down in a foreign network followed by recovery in its home network or a different foreign network. This invention further enables the corresponding nodes to establish connection with the mobile node after the recovery of the mobile node.

BACKGROUND OF THE INVENTION

By way of background, in today's world, mobile equipment, such as laptop computers, cellular phones, personal handheld computers (also known as PDAs) and the likes, are used by everybody to conduct personal and work related business. The employees of a company are able to access the full resources of their employer while traveling or working from home. Cellular phones are enabling everybody to stay in touch with work and friends and family while in move. This capability has become increasingly important in today's personal and business life. Different networks are used by each of the above mentioned mobile equipment to connect to its destination. For example, cellular phone users use the network of their cellular service providers, also know as the home network, or the network of other cellular providers, also known as the foreign network while out of their home network. An employee of a company connects to the resources of the company and other company employees using the Intranet of the company (i.e., home network) or other networks (i.e., foreign networks) while outside of the coverage of the company Intranet.

Referring to FIG. 1, a conceptual representation of a typical network 10 is shown. Network 10 includes home agent 12 and nodes 14-18. It should be noted that network 10 could have additional components that are not shown in FIG. 1 for simplicity. Also, although one home agent 12 and three nodes 14-18 are shown in FIG. 1, network 10 could have more than one home agent. In network 10, nodes 14-18 communicate with each other and home agent 12 through network connection 20. Network connection 20 includes wired and wireless networks, Ethernet-type networks, intranets, extranets, the Internet, and/or telephony networks, among other types of networks. In addition to communicating with each other, each of nodes 14-18 could also communicate with nodes in other networks that are connected to network 10. Each of nodes 14-18 could be permanently attached to network 10 or could be a mobile node. A mobile node can communicate with other nodes within network 10 or outside of it while operating in network 10 or while operating in another network as a guest node. When nodes 14-18 are operating in network 10, they are operating within their home network. When they are operating in networks other than network 10, they are operating in a foreign network. In FIG. 1, node 14 is designated as the mobile node. Although node 14 is designated as the mobile node in network, nodes 16 and 18 could also be mobile nodes.

When mobile node 14 is operating in network 10, it obtains an Internet Protocol (IP) address (hereinafter referred to as the "home address"). There are different mechanisms by which mobile node 14 obtains a home address. These mechanisms are known to those knowledgeable in the art and, thus, will not be discussed any further herein. The home address is used by home agent 12, nodes 16 and 18, and nodes and home agents (not shown) belonging to networks other than network 10 to communicate with node 14. Also, mobile node 14 uses its home address to communicate with home agent 12, nodes 16 and 18, and nodes and home agents (not shown) belonging to networks other than network 10.

Each time that the mobile node 14 leaves its home network 10 and enters a foreign network, the mobile node 14 obtains a new IP address, which is also referred to as the care-of-address. While mobile node 14 operates within the foreign network, the mobile node 14 communicates with the corresponding nodes. The corresponding nodes include home agents and correspondent nodes. The correspondent nodes are those nodes other than the home agent that either establishes one or more communication sessions with mobile node 14 or that mobile node 14 establishes one or more communication sessions with them. The correspondent nodes communicate with the mobile node in one of at least two ways. First, the correspondent nodes may send messages to the mobile node 14 using the home address. The home agent 12 would then tunnel the message to the mobile node 14. In order, for the home agent 12 to be able to route the message to the mobile node 14, it needs to know the care-of-address of the mobile node 14. That is why the home agent 12 is informed of the care-of-address by the mobile node 14. An alternative way that the correspondent nodes may communicate with the mobile node 14 is direct communication with the mobile node 14 using its care-of-address. Thus, the care-of-address is communicated to the home agents and all the correspondent nodes that have an on-going communication session with mobile node 14 or that intend to establish one or more direct communication sessions with mobile node 14.

To communicate the care-of address, the mobile node 14 sends a binding Update packet ("BU") to the corresponding nodes. As mentioned above a corresponding node could include a home agent or a correspondent node. A BU packet includes at least the source address, which is the care-of address of the mobile node 14, a destination address, which is the address of the corresponding nodes, and a BU message. Typically, a BU message includes the information required by the BU message protocol. The corresponding nodes receiving the BU packet decipher the care-of address information from the BU packet, decipher the additional information from the BU message, and update their records to ensure that the correct IP address is recorded and associated with the mobile node 14. Thereafter, the correspondent nodes may communicate with the mobile node 14 either directly using the care-of address or through the home agent 12. The mobile node 14 first sends a BU packet to the home agents 12 to inform the home agent 12 of its care-of address while in the foreign network. This step is also known as home registration process. Upon receiving a binding acknowledgement from the home agent 12 that it has successfully processed the care-of address information, the mobile node 14 completes return routability procedure, based on the mobility support in IPV6 standard, with each of its correspondent nodes that have one or more communication sessions with mobile node 14 prior to the mobile node entering the foreign network, and sends BU packet to all these nodes.

Once the correspondent nodes receive the BU packets, they update their records and, thereafter, use the care-of address if they wish to establish direct communicate with the mobile node 14. If the mobile node 14 intends to establish a communication session with a new correspondent node, it may send, depending on the application being executed by the mobile node, a BU packet to the new correspondent node and provide the new correspondent node with its care-of address. This would enable the new correspondent node to communicate with the mobile node 14 directly. On the other hand, if a new correspondent node intends to establish a communication session with mobile node 14 and does not have the new care-of address for the mobile node 14, it sends a message to mobile node 14 using its home address. Upon receiving this message, the home agent 12 tunnels the message to the mobile node 14 using its care-of address. Once the mobile node receives this request from the new correspondent node, it may respond to the correspondent node by sending it a new BU packet to provide its care-of address for direct communication or by sending a message to the home agent 12 to be tunneled back to the correspondent node. The process of mobile node 14 sending a message back to the home agent 12 to be tunneled back to the correspondent node is also known as "reverse tunnel" process. Thereafter, a direct communication between the new correspondent node and mobile node 14 may happen if the correspondent node wishes to use the care-of address of the mobile node 14. If the mobile node 14 moves to a new foreign network, the above steps are repeated so that the ability to correspond between mobile node 14 and the corresponding nodes is preserved.

The problem arises when the mobile node is shut down abruptly. This could occur because of a loss of power to the mobile node 14, crash caused by the operating system, crash caused by a failure of an application, or other events causing an abrupt shut down. Typically the abrupt shut down causes the mobile node to lose all the on-going communication sessions that it had with the corresponding nodes and all data regarding these nodes. If the mobile node recovers after the abrupt shut down while in the same foreign network, the care-of address can still be used by the corresponding nodes to reestablish connection with mobile node 14. On the other hand, if the mobile node 14 recovers after the abrupt shut down in its home network or in new foreign network, to reestablish direct communication with the mobile node 14, the corresponding nodes use the care-of address since this is the last valid address that the corresponding nodes have for the mobile node 14. However, since mobile node 14 is now either in its home network or a new foreign network, the care-of address is no longer valid. Thus, any message sent to mobile node 14 using the care-of address will not reach mobile node 14. This will continue until the length of the time (mentioned above) specified in the binding update message expires. This could render the mobile node inaccessible to the corresponding nodes for an unacceptable amount of time.

From the above, it is clear that a solution is needed to ensure continuous connectivity between a mobile node and all the corresponding nodes after a mobile node recovers from an abrupt shut down.

SUMMARY OF THE INVENTION

The foregoing problems are solved and an advance in the art is obtained by a method, system and computer program product for ensuring that a mobile node maintains its ability, after it recovers from an abrupt shut down, to communicate with the nodes that it had communication sessions with prior to the abrupt shut down.

In one embodiment, a method of reestablishing connection by a mobile node after a shut down comprises: after recovering from the shut down, examining a binding update table to determine whether the table includes any entry; determining whether the mobile node is in a new foreign network; for each entry in the binding update table, sending an update message to an identified node in the entry; and replacing the entry from the binding update table with a new entry corresponding to the update message.

In one embodiment, the existence of an entry in the binding update table after a recovery from the shut down indicates that an abrupt shut down had occurred. The lack of any entry after a recovery from a shut down indicates that a normal shut down had occurred.

In one embodiment, each entry of the binding update table includes a home address associated with the mobile node, an IP address associated with the identified node, and a sequence number that is assigned to a binding update packet corresponding to the entry in the binding update message. The binding update table further may include information specifying the duration of binding with the identified node in the entry.

In one embodiment, the update message is only sent to an identified node in the entry of the binding update table if the specified duration of binding has not lapsed.

In yet another embodiment, a method of operating a mobile node comprises: detecting that the mobile node has moved from a first foreign network to a second foreign network; sending a first update to a node having established a communication session with the mobile node prior to the mobile node entering the second foreign network; experiencing an abrupt shut down by the mobile node while operating in the first foreign network; detecting the restoration of normal operation by the mobile node from the abrupt shut down in the second foreign network; examining a binding update table to determine whether the table includes any entry; for each entry in the binding update table, sending a second update message with the new care of address to the node; and replacing the binding update table with information regarding the second update message.

In certain embodiment, the examining of the binding update table further includes determining if a duration of binding associated with each entry has elapsed, and for each entry that the associated duration of binding has elapsed, not sending the second update message to the node identified in the entry.

In yet another embodiment, an article of manufacture comprises: a computer-readable medium; and programming logic recorded on the computer readable medium for programming a data processing platform to operate as by: examining a binding update table to determine whether the table includes any entry after a mobile node recovers from a shut down, for each entry in the binding update table, sending an update message to an identified node in the entry, and updating the binding update table with information regarding the update message.

In yet another embodiment, a method of establishing connection with a mobile node by a node after a mobile node has recovered from a shut down comprises: receiving an update message from the mobile node after the mobile node has recovered from a shut down, wherein the update message includes new information about the mobile node, and establishing connection with the mobile node using the new information about the mobile node.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

Figure 1:
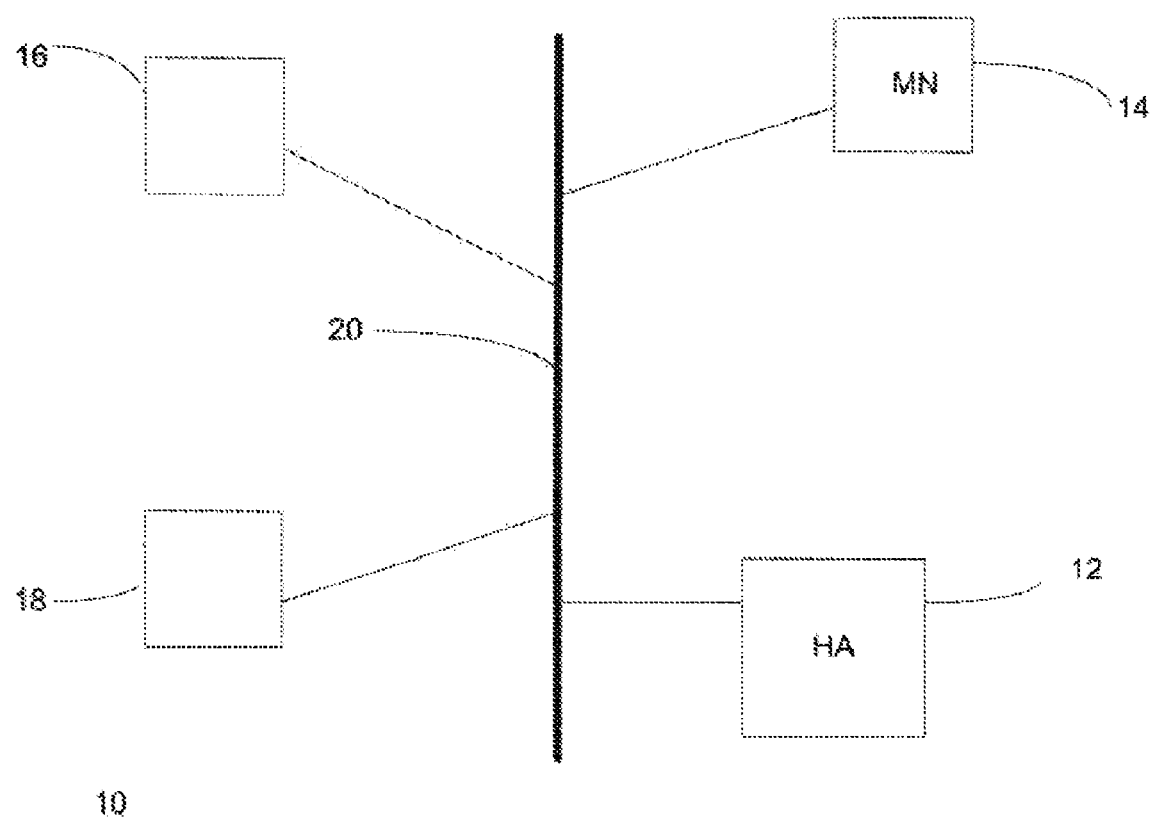
FIG. 1 is a block diagram of a network.

It will be readily understood that the components of the invention, as generally described and illustrated in the Figures herein, may be arranged and designed in a wide variety of different configurations. Thus, the following more detailed description of the embodiments of the apparatus, system, and method of the invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The method, apparatus, and article of manufacturing of the invention provides valuable advantage over the prior art. According to the invention, if a mobile node that is operating in a foreign network suffers an abrupt shut down; it can successfully reestablish communication with the corresponding nodes in communication with the mobile node prior to the abrupt shut down. Furthermore, the corresponding nodes may also reestablish communication with the mobile node after it recovers from the abrupt shut down. According to the invention, after recovering in the home network from the abrupt shut down, the mobile node examiners the content of a binding update table for any existing entry. For each entry in the binding update table, the mobile node sends an update message to the corresponding node identified in the entry informing the node that the previous IP address is now valid. If the mobile node recovers from an abrupt show down in a new foreign network, the mobile node examiners the content of a binding update table for any existing entry. For each entry in the binding update table that the time specified in it has not lapsed, the mobile node sends an update message to the corresponding node identified in the entry providing the node with its new IP address and informing the node that the previous IP address is now invalid. Without the teachings of the invention, if the mobile node recovers in its home network or in a new foreign network from an abrupt shut down occurring while the mobile node was operating in a foreign network, the corresponding nodes would not be able to correspond with the mobile node from an unacceptable period of time.

Technical Details

Figure 2:
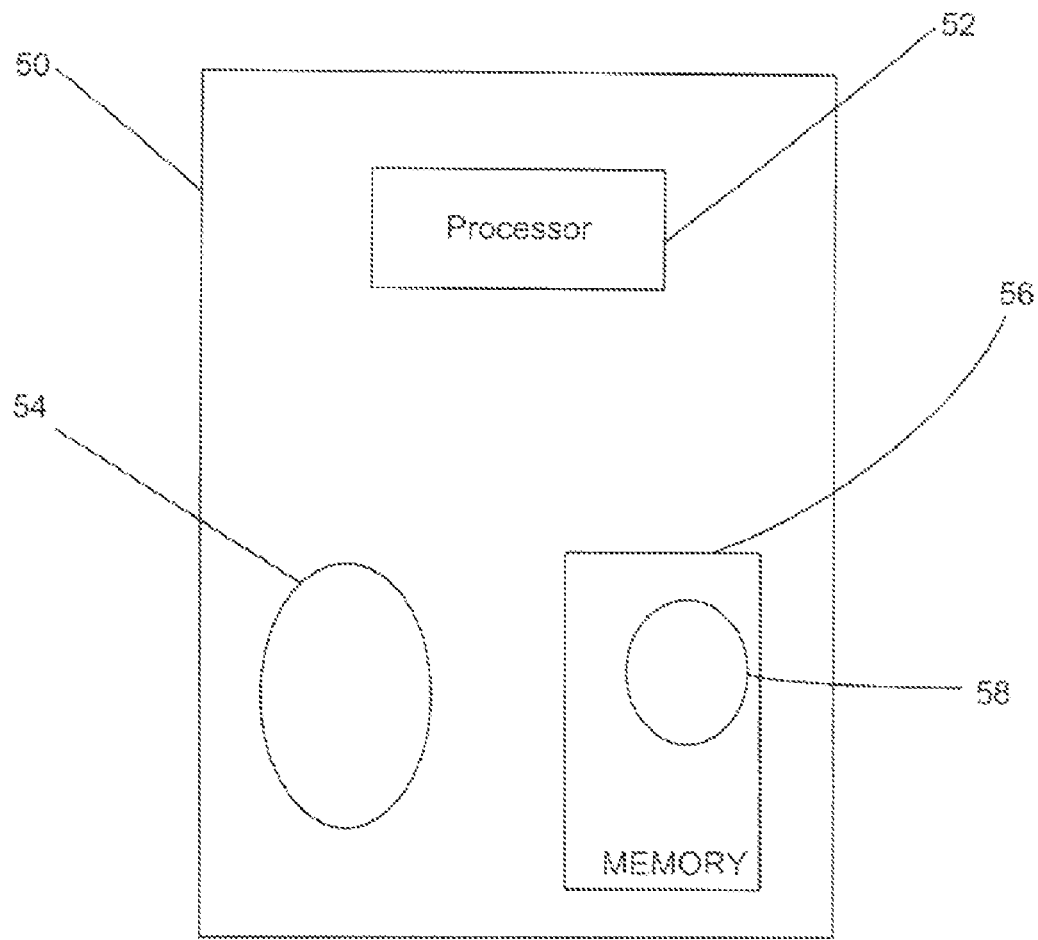
FIG. 2 is a block diagram of a mobile node in accordance with the invention.

Referring to FIG. 2, there is illustrated a block diagram of an exemplary mobile node 50 according to the invention. Mobile node 50 includes a processing unit 52 ("processor"), an update module 54, and a persistent memory 56. The persistent memory 56 houses a binding update table 58. It should be noted that mobile node 50 may include other components that are not shown in FIG. 2 for simplicity.

When mobile node 50 operates in its home network, it can communicate with other nodes in the home network and in any foreign networks using the home address that it obtains from the home network. However, when mobile node 50 moves out of its home network and enters a foreign network, it obtains a new IP address, which is also known as a care-of address, from the foreign network. This new care-of address is communicated to the home agent in its home network to ensure that the home agent is able to tunnel messages to mobile node 50 while it is operating in the foreign network. In addition, in order to maintain the ability to communicate directly with correspondent nodes, mobile node 50 communicate its care-of address with the correspondent nodes as well. As mentioned above, the home agent and the correspondent nodes are collectively referred to as the corresponding nodes. Furthermore, the correspondent nodes include nodes in the home network of the mobile and nodes in other networks, including the foreign network. To achieve this, the update module 54 sends a BU packet to each of the corresponding nodes. The BU packet will be described in more details below. For each BU packet sent, the update module 54 stores certain information associated with the particular BU packet in the binding update table 58. It should be noted that the binding update table 58 is created in a persistent memory so that any loss of power to the mobile node 50 caused by any reason would not cause the loss of information stored in the binding update table 58.

It should further be noted that the mobile node 50 may have more than one home network. In that situation, it has one home address for each home network. Thus, when the mobile node 50 enters the foreign network, for each home address, it sends BU packets to the corresponding nodes using the home address and the binding update table 58 is populated accordingly.

If while operating in a foreign network, mobile node 50 suffers an abrupt shut down, upon recovery from the abrupt crash, the update module 54 determines whether the binding update table 58 includes any entry or is empty. If there are entries in the binding update table 58, for each entry the update module 54 sends a new BU packet to the corresponding node identified in the particular entry. The identified corresponding node could include the home agent or a correspondent node. As it will be described further below, this new BU packet will inform the identified corresponding node that the IP address reported in the previous BU packet is now invalid, that the corresponding history regarding this IP address, including a corresponding binding cache entry, should be deleted, and that the new IP address that is provided in the BU packet must be used to communicate with the mobile node. Thereafter, the corresponding nodes communicate with the mobile node using its home address or the newly furnished IP address if operating in a new foreign network. It should be noted that as it will be described in details below, if the time specified in an entry has lapsed, the entry is simply deleted from the binding update table without sending a new BU packet to the corresponding node specified in the entry.

It should be noted that the update module 54 may be implemented in hardware, software, or a combination of hardware and software. When the update module 54 is implemented in software, it may be stored in memory 56. To execute the update module 54, processor 52 would access the memory 58.

Figure 3:
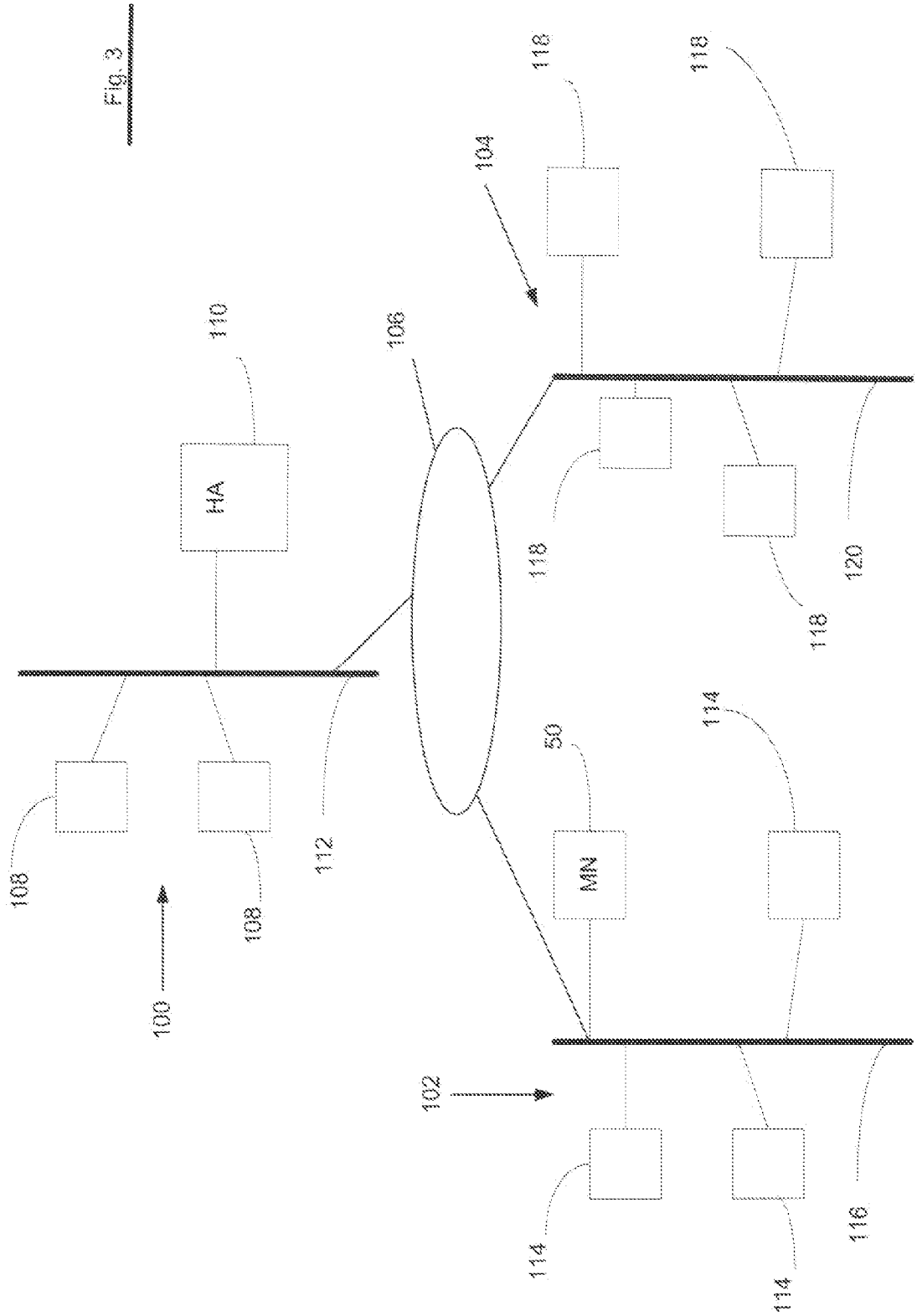
FIG. 3 is a block diagram of different networks in communication with each other via a network connection. The depicted networks include a home network and two foreign networks.

The operation of the mobile node 50 in accordance with the invention will now be described in more details in conjunction with FIGS. 3-9. In doing so, reference shall be made to the elements introduced in FIGS. 1 and 2 where appropriate. Referring now to FIG. 3, a block diagram of three networks 100, 102, and 104 are shown that are connected together through a network connection 106. Network connection 106 may include wired and wireless networks, Ethernet-type networks, intranets, extranets, the Internet, and/or telephony networks, among other types of networks. Network 100 is the home network of mobile node 50 and includes nodes 108 and home agent 110. Nodes 108 and home agent 110 are connected to each other through a network connection 112. Home agent 110 may include routers or other similar components that are capable of tunneling (or directing) messages to appropriate nodes within network 100 or other networks, such as networks 102 and 104.

Network 102 is a foreign network that mobile node 50 has moved into temporarily. Network 102 includes nodes 114 that are connected to each other through a network connection 116. Network 104 is another network that includes nodes 118 that are connected to each other through a network connection 120. Any of the nodes in networks 100, 102, and 104 can communicate with a node in another network through the network connection 106. Furthermore, when nodes 108, 114, and 118 establish a communication session with mobile node 50, they are considered the correspondent nodes. Although not shown, networks 102 and 104 may include other nodes that provide the same capabilities as the home agent 110. In addition, networks 100, 102, and 104 may include other components that are not shown in FIG. 3 for simplicity only.

Figure 4:
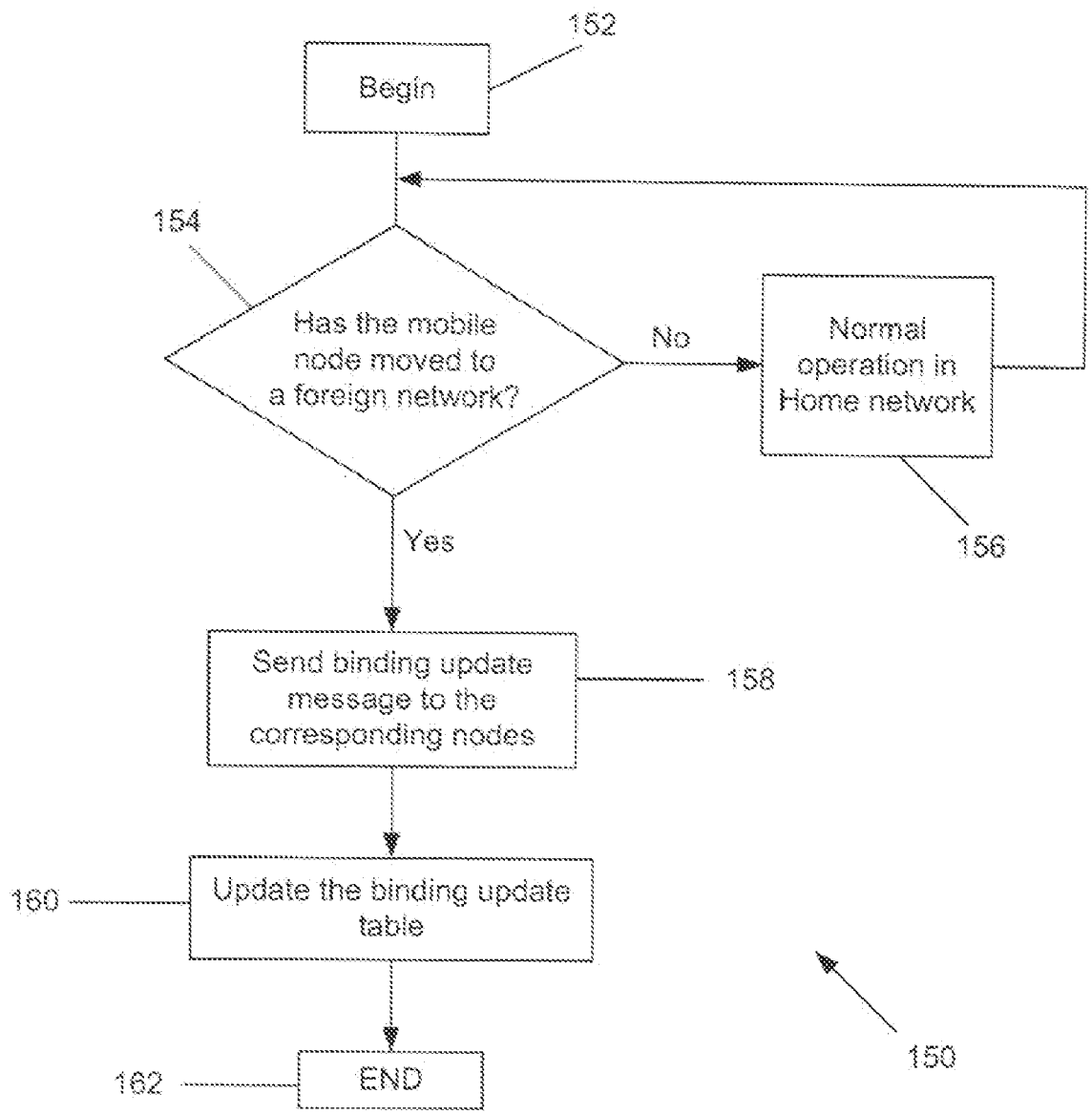
FIG. 4 is a flow diagram depicting the process of sending BU packets to the home agent and correspondent nodes by the mobile node and populating the binding update table with certain information regarding each BU packets.

Referring to FIG. 4, a flow diagram showing the process 150 in which the mobile node 50 informs the corresponding nodes that it has a new care-of address. A new care-off address may be obtained by the mobile node 50 if it moves from the home network to a foreign net work or if it moves from one foreign network to a next one. The process 150 begins in step 152. Next, the mobile node 50 determines, step 154, whether it has moved to a foreign network, e.g., network 102. Once in the foreign network, such as network 102, mobile node 50 obtains a care-of address from the foreign network. If the mobile node 50 is not operating in a foreign network, which means that it is operating in its home network, it continues operation, step 156, using its home address. If the answer to the question in step 154 is yes, the mobile node is operating in a foreign network.

In order for the mobile node 50 to be able to continue existing communication sessions, directly or indirectly through the home agent 110, with one or more corresponding nodes 114 or 118, it needs to first provide its new care-of address to corresponding nodes, including the home agent 110 and the correspondent nodes 114 or 118. In one embodiment, the existing communication session is one that was in existence prior to mobile node's move to the foreign network. Regarding establishing communication sessions with new correspondent nodes, as mentioned above, the mobile node 50 may send a new BU packet to the new correspondent nodes for direct communication purposes or it may use the reverse tunnel mechanism described above. Next, in step 158, the mobile node 50 sends its new care-of address to the corresponding nodes. First, the mobile node sends its new care-of address to the home agent 110. In another words, the mobile node 50 goes through the process of home registration. The home agent 110 needs to be informed of the new care-of address so that it knows how to tunnel to the mobile node 50 all the messages that are sent using mobile node's home address while mobile node is operating in the foreign network 102.

In one embodiment, the processor 52 causes the update module 54 to send a BU packet to the home agent 110 to provide it with the care-of address of the mobile node 50. A BU packet is generated in accordance with the currently available standards known in the art. The BU packet includes the necessary information for the recipient node, including the home agent or the correspondent node, to enable the recipient node to communicate directly with the mobile node 50 while mobile node 50 is operating in foreign network 102. In one embodiment, a BU packet includes at least the source IP address, which includes the care-of address of mobile node 50, the destination IP address, which includes the home agent address or the correspondent node address, and a BU message that includes at least a sequence number assigned to the BU packet and the duration of binding. In other embodiments, additional information, such as home registration bit, may also be communicated within the BU message. The home registration bit is set when the BU packet is sent to the home agent. The sequence number represents the place of a particular BU packet with respect to other BU packets. The duration of binding information represents the duration of time that the new care-of address is to be used.

Returning back to FIG. 4, upon receiving a binding acknowledgment from the home agent 110 that is has received the new care-of-address and updated its records, the mobile node 50 sends a BU packet to every correspondent node 114 or 118 that are in communication with the mobile node 50. Furthermore, the mobile node 50 may send a BU message to every correspondent node 114 or 118 that it intends to establish direct communication session as described above. In one embodiment of the invention, processor 52 causes the update module 54 to send the BU packets. Next, in step 160, for every BU packet that has been sent, certain information associated with the BU packet will be stored in an entry in the binding update table 58. In one embodiment, the processor 52 causes the update module 54 either to store or causes the storing of the certain information associated with the BU packets in the binding update table 58. Each entry in the binding update table 58 is associated with one BU packet and may include at least the home address of the mobile node 50, the IP address of the corresponding node, the home agent or the correspondent node, to which the BU packet was send, and the sequence number of the associated BU packet, home registration bit, and the duration of the binding information. It should be noted that the information stored in each entry location of the binding update table 58 could include other information. Once a BU packet is sent to all corresponding nodes, as described above, and the binding update table 50 is updated, the process ends, step 162. As mentioned above, if the mobile node 50 has more than one home network and home address, for each home address, the steps of FIG. 4 are performed to provide the care-of-address to the corresponding nodes using the other home addresses.

It should be further noted that in one embodiment of the invention, the mobile node 50 may include a cache memory (not shown in FIG. 2) that includes a local replica of the binding update table 58. The local replica of the biding update table 58 could be updated and once all update are done, the two tables would be synchronized.

While the mobile node 50 is operating in foreign network 102, it may shut down properly or suffer an abrupt shut down. A proper shut down is where the mobile node is shut down by ending all the current communication sessions with the corresponding nodes and cutting off the power to the mobile node's components. On the other hand, an abrupt shut down occurs when the mobile node faces an abrupt loss of power, failure of the operating system (not shown in FIG. 2), failure of any applications (not shown) running on the top of the operating system that causes the entire system to shut down, failure of any of the components of the mobile node 50, or any other reason that causes the mobile node 50 to shut down.

Figure 5:
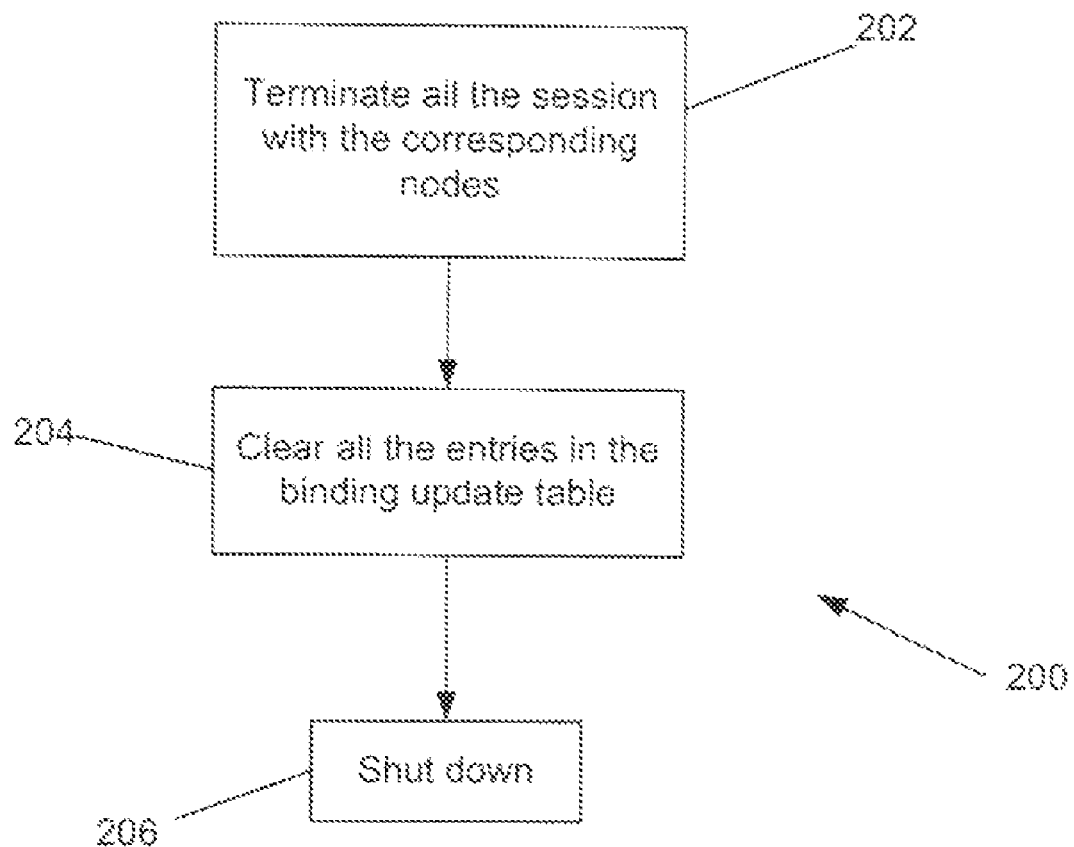
FIG. 5 is a flowchart of a method for proper shut down by a mobile node in accordance with the invention.

Referring now to FIG. 5, the process 200 that the mobile node 50 follows to go through a proper shut down is shown. To properly shut down, the mobile node 50 terminates, step 202, all the current communication sessions with the corresponding nodes 114 or 118. Next, in step 204, all the entries in binding update table 58 are cleared. In one embodiment, the update module 54 clears all the entries in the binding update table 58. Finally, in step 206, the mobile node 50 shuts down.

Figure 6:
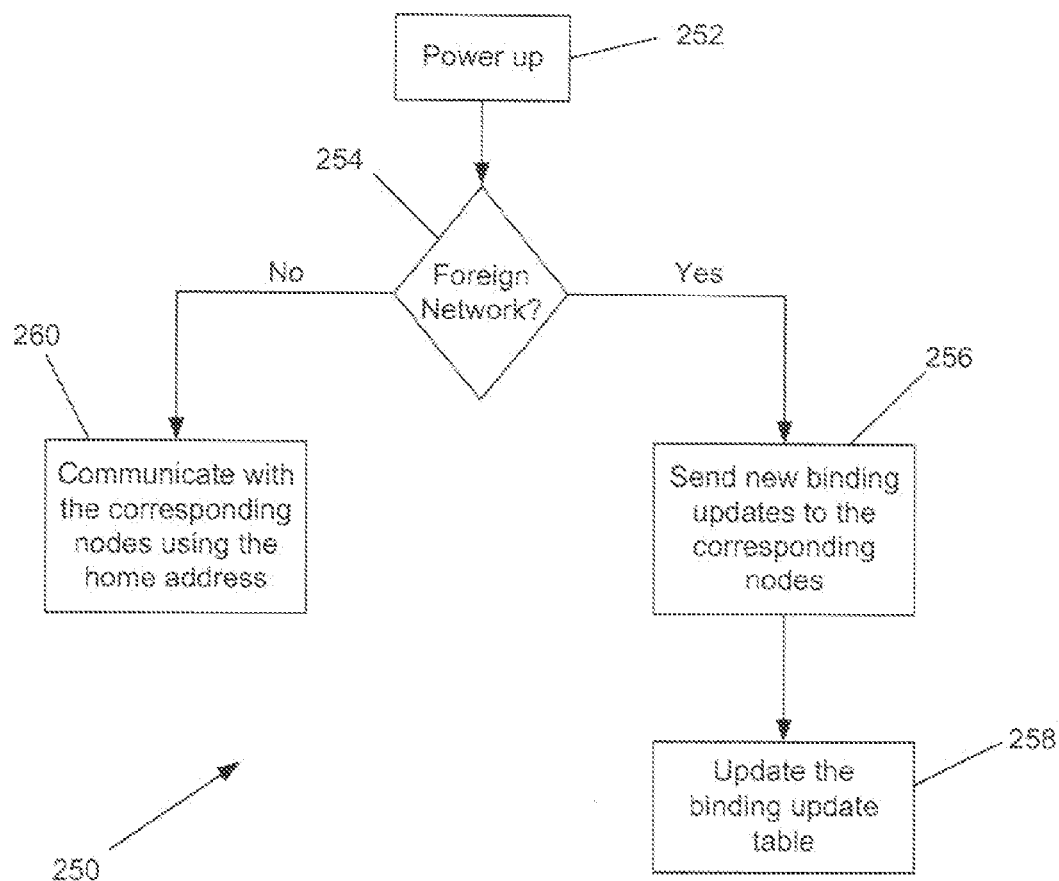
FIG. 6 is a flowchart of a method for recovering from a proper shut down by a mobile node in accordance with the invention.

Referring to FIG. 6, the process 250 for restarting the mobile node 50 after a proper shut down is provided. In step 252, the power is restored to the components of mobile node 50. In step 254, the mobile node 50 determines whether it is still operating in a foreign network, be it the one that it was operating in prior to proper shut down or a new foreign network, or it is back in its home network 100. If the mobile node 50 determines that it is operating in the same foreign network before the shut down or in a new foreign network, it sends, step 256, a new BU message to each corresponding node that it intends to establish communication with as explained above. Thereafter, the binding update table 58 is updated, step 258, with certain information as described above. Essentially, the mobile node 50 performs the steps in FIG. 4. On the other hand, if the mobile node 50 determines that it is operating in its home network, it proceeds, step 260, to establish communication session with the corresponding nodes, home agent 110 or the correspondent nodes 114 or 118, using its home address as if it had never left its home network 100. However, before doing that, the mobile node 50 informs the home agent 110 that it has returned to the home network by sending it a new BU packet.

Figure 7:
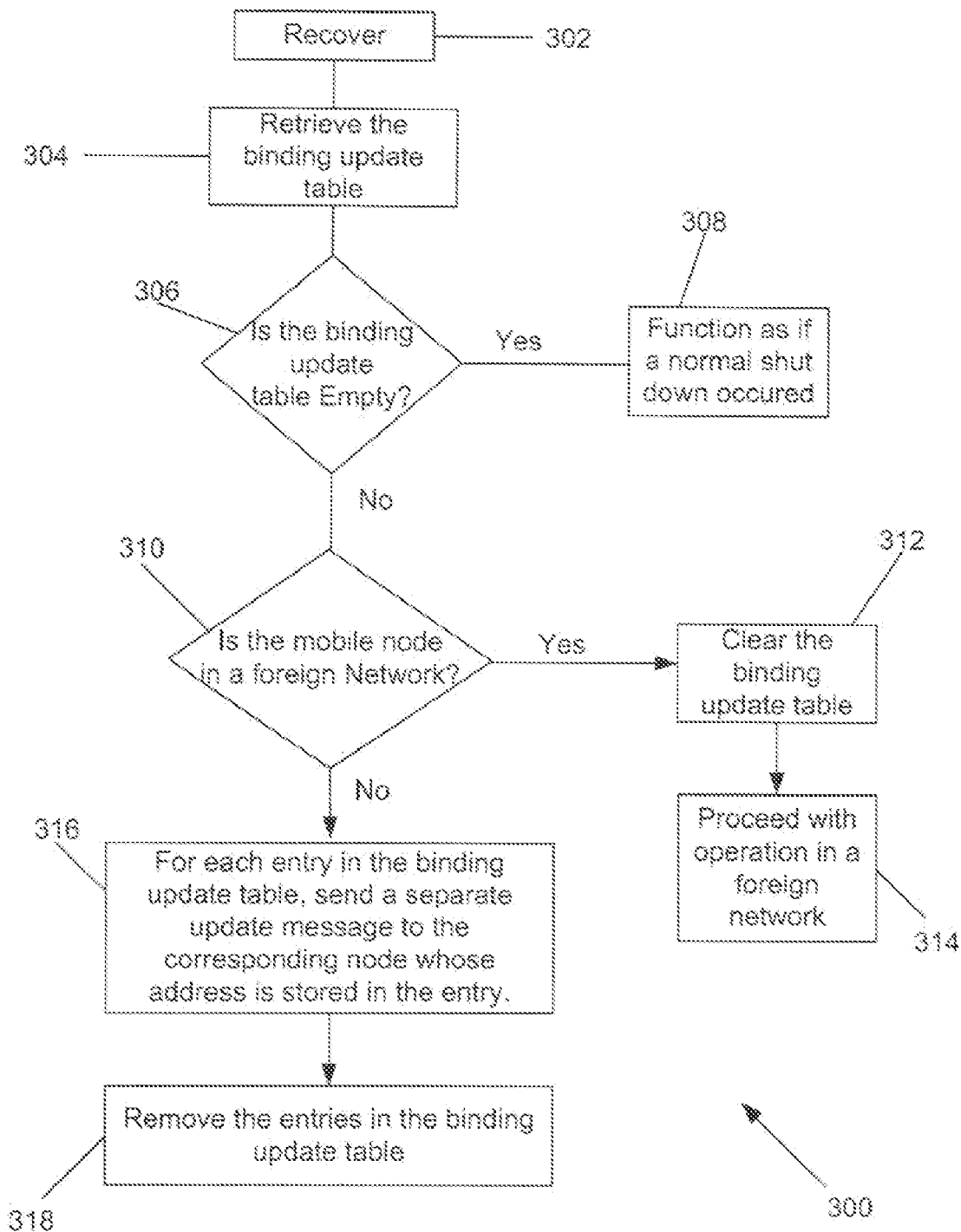
FIG. 7 is a flowchart of a method for recovering from an abrupt shut down by a mobile node in accordance with the invention.

As mentioned above, while operating in the foreign network 102, the mobile node 50 may suffer an abrupt shut down. When this happens, all current communication sessions with the corresponding nodes, home agent 110 or correspondent nodes 114 or 118, are terminated and any information regarding these sessions and the corresponding nodes will be lost. However, the abrupt shut down will not effect the information stored in the binding update table 58 since it is stored in a persistent memory. Referring to FIG. 7, the process 300 of recovering from an abrupt shut down caused by the factors mentioned above is provided in a form of a flow diagram. In the alternative of FIG. 7, the recovery from an abrupt shut down occurs either in the home network of mobile node 50 or in the foreign network in which mobile node was operating prior to the abrupt shut down. The situation where the mobile node 50 recovers from an abrupt shut down in a new foreign network is described later in this application. The process 300 begins when the mobile node 50 recovers, step 302, from the abrupt shut down. The process that the mobile node 50 goes through to recover from an abrupt shut down depends on the cause of the abrupt shut down and is not the subject of the invention.

Next, the content of the binding update table 58 is retrieved, step 304, and examined, step 306, to determine if the table is empty or includes entries. In one embodiment, processor 52 causes the update module 54 to perform this step. If the binding update table 58 is empty, the mobile node 50 would continue functioning, step 308, as if it is recovering from a proper shut down that was described with respect to FIG. 6. However, if the binding update table 58 includes entries, it is determined, step 310, whether mobile node 50 is operating in the same foreign network before the abrupt shut down, such as network 102 or the home network 100. If the answer to the question in step 310 is yes, meaning that the mobile node 50 is operating in the same foreign network before the abrupt shut down, then all the entries in binding update table 58 are cleared, step 312, and the mobile node 50 proceeds to function as if it has entered a foreign network, step 314, as described above with respect to FIG. 4. In one embodiment, the entries of the binding update table 58 may be cleared by the update module 54.

If the answer to the question in step 310 is no, the mobile node 50 has just recovered in its home network after experiencing an abrupt shut down in foreign network 102. Therefore, the mobile node 50 needs to inform the corresponding nodes, with which it had an on going communication sessions prior to the abrupt shut down, that the care-of address is no longer valid and that the corresponding history regarding this IP address, including a corresponding binding cache entry, should be deleted. The corresponding nodes are identified in the entries stored in binding update table 58. For each corresponding node, home agent 110 or the correspondent nodes 114 or 118, identified in each entry in binding update table 58, mobile node 50 sends, step 316, a new BU packet. The new BU packet informs the recipient node that the care-of address is no longer valid and no longer to be used and that the corresponding history regarding this IP address, including a corresponding binding cache entry, should be deleted. The form of the new message will comply with the currently available standards known in the art. As mentioned before, each entry in the binding update table 58 includes at least the home address of the mobile node 50 and the address of the corresponding node receiving the BU packet in steps 158 and 160 of FIG. 4. Thus, the mobile node 50 knows its home address and the address of the corresponding node to which it must send a new BU packet. In one embodiment, the update module 54 sends the new BU packets to the identified corresponding nodes. For each new BU packet that is sent, the associated entry in the binding update table 58 is removed, step 318. Thus, by the time that all the corresponding nodes identified in the entries of the binding update table 58 have been notified, the binding update table 58 will be empty.

Figure 8:
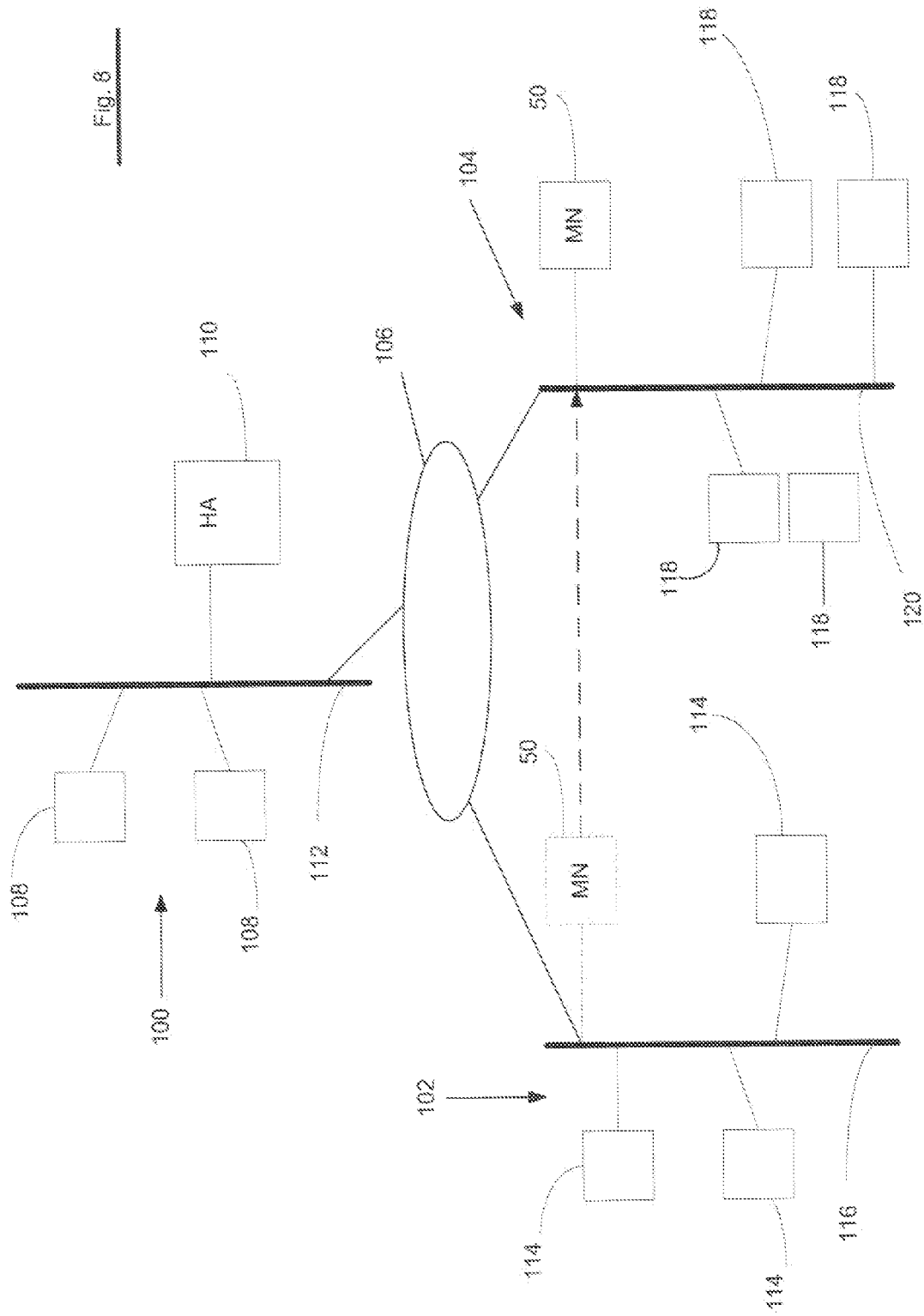
FIG. 8 is a block diagram of different networks in communication with each other via a network connection. The depicted networks include a home network and two foreign networks. IN the block diagram of FIG. 8, the mobile node has moved from one foreign network to a new foreign network after an abrupt shut down.
Figure 9:
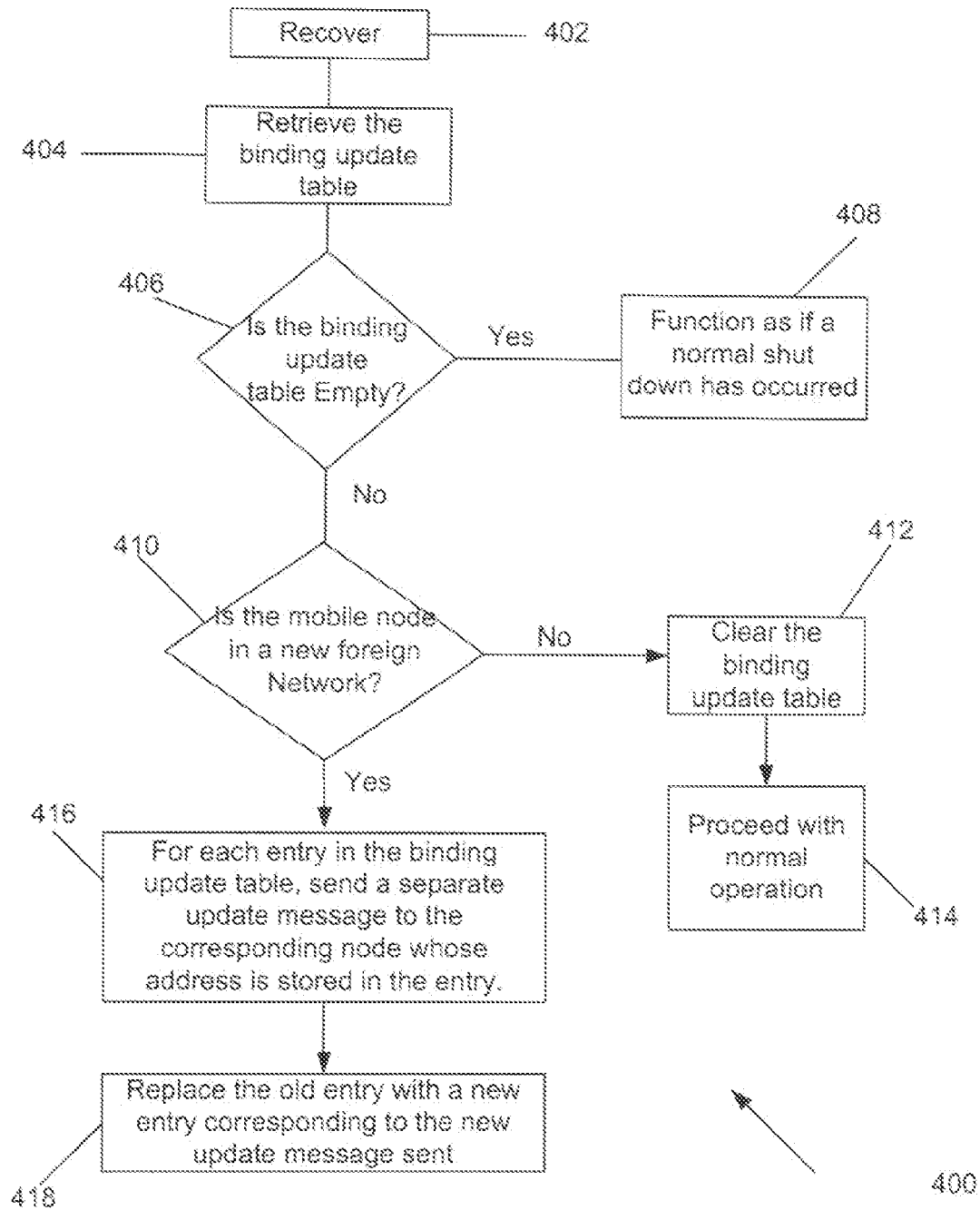
FIG. 9 is a flowchart of a method for recovering from an abrupt shut down by a mobile node in a new foreign network in accordance with the invention.

Referring to FIG. 8, the block diagram of the three networks in FIG. 3 is shown again. However, in FIG. 8, it is shown that mobile node 50 has moved to the new foreign network 104 after the abrupt shut down had occurred. In another words, mobile node 50 has recovered from the abrupt shut down in a new foreign network 104. Referring to FIG. 9, the process 400 of recovering from an abrupt shut down caused by the factors mentioned above is provided in a form of a flow diagram. The process 400 begins when the mobile node 50 recovers from the abrupt shut down, step 402. The process that the mobile node 50 goes through to recover from an abrupt shut down depends on the cause of the abrupt shut down and is not the subject of the invention.

Next, the content of the binding update table 58 is retrieved, step 404, and examined, step 406, to determine if the table is empty or includes entries. In one embodiment, processor 52 causes the update module 54 to perform this step. If the binding update table 58 is empty, the mobile node 50 would continue functioning, step 408, as if it is recovering from a proper shut down that was described with respect to FIG. 6. However, if the binding update table 58 includes entries, it is determined, step 410, whether mobile node 50 is operating in the same foreign network that it was operating before the abrupt shut down "the old foreign network", network 102, or it has entered a new foreign network, network 104. If it determined in step 410 that mobile node 50 is operating in the old foreign network, then all the entries in binding update table 58 are cleared, step 412, and the mobile node 50 proceeds to function as if it has entered this foreign network for the first time, step 414, as described above with respect to FIG. 4. In one embodiment, the entries of the binding update table 58 may be cleared by the update module 54.

If it is determined in step 410 that mobile node 50 has just recovered in a new foreign network after experiencing an abrupt shut down in the old foreign network 102, the mobile node 50 needs to inform the corresponding nodes, with which it had an ongoing communication session prior to the abrupt shut down, that the care-of-address has been provided to them previously is no longer valid, that the corresponding history regarding this IP address, including a corresponding binding cache entry, should be replaced with the new care of address that it obtains from the new foreign network. Thus, mobile node 50 first obtains a new care-of-address from the new foreign network 104. Thereafter, for each corresponding node, (i.e., home agent 110 or the correspondent nodes 114 or 118) identified in each entry in binding update table 58 that the specified duration of binding has not lapsed yet, mobile node 50 sends, step 416, a new BU packet. The new BU packet informs the recipient node that the old care-of-address is no longer valid and no longer should be used, that the corresponding history regarding this care-of-IP address, including a corresponding binding cache entry, should be deleted, and provides the corresponding node with the new care-of-address to the corresponding nodes. In addition to the new care-of-address, which is the source IP address, the BU packet provides the additional information that was discussed above with respect to FIG. 4, including, but not limited to, the destination IP address, which may include the home agent address of the correspondent node address, and a BU message that includes at least a sequence number assigned to the BU packet and the duration of binding. For those entries in the binding update table that the duration of binding has lapsed prior to recovery of node 50, the respective entry in the binding update table is deleted without further action. In other words, the lapse of duration of binding signifies the end of a need to communicate with the corresponding node identified in the entry, thus eliminating a need for sending the identified corresponding node BU packet. The form of the new message will comply with the currently available standards known in the art. As mentioned before, each entry in the binding update table 58 includes at least the home address of the mobile node 50 and the address of the corresponding node receiving the BU packet in steps 158 and 160 of FIG. 4. Thus, the mobile node 50 knows its home address and the address of the corresponding node to which it must send a new BU packet. In one embodiment, the update modules 54 sends the new BU packets to the identified corresponding nodes. For each new BU packet that is sent, the associated entry in the binding update table 58 is replaced with a new entry corresponding to the new BU packet about the new care-of-address, step 318.

The corresponding node that receives the new BU packets updates the information that it has about the mobile node 50, including the new care-of-address of the mobile node 50, and is now able to establish connection with the mobile node 50 using the new care-of-address.

Advantage Over the Prior Art

As described above, the invention provides a means and method for a mobile node to recover from a shut down, be it proper shut down or an abrupt and unexpected shut down, and maintain its ability to reestablish communication sessions with the corresponding nodes without any delay. In particular, the invention provides a means and method that enables the mobile node to recover in its home network or a new foreign network from an abrupt shut down occurred while it is operating in a foreign network and to maintain its ability to reestablish communication with its corresponding nodes without any time delay. The invention also enables the corresponding nodes to establish connection with the mobile node after the mobile node recovers from the abrupt shut down. As described above, in the current state of the art, after recovering from an abrupt and unexpected shut down, the mobile node cannot receive any messages from the corresponding nodes for the remaining time of the duration specified in the BU packet that was communicated to the corresponding nodes while the mobile node was operating in a foreign network prior to the shut down.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of re-establishing connection by a mobile node after a shut down comprising:
   determining whether the mobile node recovering from the shut down is in a new foreign network;
   after recovering from the shut down, examining a binding update table to determine whether the table includes any entry;
   for each entry in the binding update table, sending an update message to an identified node in the entry; and
   replacing the entry from the binding update table with a new entry corresponding to the update message.

2. The method of claim 1, wherein, an existence of an entry indicates an abrupt shut down.

3. The method of claim 1, wherein lack of any entry in the binding update table indicates a normal shut down.

4. The method of claim 1, wherein each entry of the binding update table includes a home address associated with the mobile node, an IP address associated with the identified node, and a sequence number.

5. The method of claim 4, wherein the sequence number is assigned to a binding update packet corresponding to the entry in the binding update message.

6. The method of claim 1, wherein each entry of the binding update table includes information specifying the duration of binding with the identified node in the entry.

7. The method of claim 6, wherein the update message is only sent to an identified node in the entry if the specified duration of binding has not lapsed.

8. The method of claim 1, wherein the identified node includes a correspondent node.

9. The method of claim 1, wherein the identified node includes a home agent.

10. A method of operating a mobile node comprising:
    experiencing an abrupt shut down by the mobile node while operating in a first foreign network;
    detecting the restoration of normal operation by the mobile node from the abrupt shut down in a second foreign network;
    examining a binding update table to determine whether the table includes any entry; for each entry in the binding update table, sending an update message to the node; and
    updating the binding update table entry with information regarding the second update message.

11. The method of claim 10, wherein examining the binding update table further includes determining if a duration of binding associated with each entry has elapsed; and for each entry that the associated duration of binding has elapsed, not sending the second update message to the node identified in the entry.

12. An article of manufacture comprising:
    a computer-readable medium; and,
    programming logic recorded on the computer readable medium for programming a data processing platform to operate as by: examining a binding update table to determine whether the table includes any entry after a mobile node recovers from a shut down in a new foreign network, for each entry in the binding update table, sending an update message to an identified node in the entry, and updating the binding update table with information regarding the update message.

13. The article of claim 12, wherein each entry of the binding update table includes a home address associated with the mobile node, an IP address associated with the identified node, and a sequence number.

14. The article of claim 13, wherein the sequence number is assigned to a binding update packet corresponding to the entry in the binding update message.

15. The article of claim 12, wherein each entry of the binding update table includes information specifying the duration of binding with the identified node in the entry.

16. The article of claim 15, wherein the update message is only sent to an identified node in the entry if the specified duration of binding has not lapsed.

17. The article of claim 12, wherein the identified node includes one of a home agent or a correspondent node.

* * * * *